United States Patent [19]

Thompson

[11] Patent Number: 5,580,196
[45] Date of Patent: Dec. 3, 1996

[54] WEAR RESISTANT TOOLS

[75] Inventor: Michael F. Thompson, London, United Kingdom

[73] Assignee: Habit Diamond Limited, London, United Kingdom

[21] Appl. No.: 39,041

[22] PCT Filed: Aug. 10, 1992

[86] PCT No.: PCT/GB92/01478

§ 371 Date: Apr. 28, 1993

§ 102(e) Date: Apr. 28, 1993

[87] PCT Pub. No.: WO93/02823

PCT Pub. Date: Feb. 18, 1993

[30] Foreign Application Priority Data

Aug. 8, 1991 [GB] United Kingdom ............ 9117099

[51] Int. Cl.⁶ .................................................. B23B 51/02
[52] U.S. Cl. ...................... 408/145; 407/53/119; 408/230
[58] Field of Search .................................... 408/144, 145, 408/227, 230; 407/53, 54, 118, 119

[56] References Cited

U.S. PATENT DOCUMENTS

| | | | |
|---|---|---|---|
| 3,912,414 | 10/1975 | Fukura et al. | 408/144 |
| 4,160,616 | 7/1979 | Winblad | 408/144 |
| 4,679,971 | 7/1987 | Maier | 408/145 |
| 4,764,434 | 8/1988 | Aronsson et al. | 428/565 |
| 4,880,707 | 11/1989 | Kohno et al. | 408/144 |
| 5,020,394 | 6/1991 | Nakamura et al. | 408/144 |
| 5,031,484 | 7/1991 | Packer | 76/108 |
| 5,226,760 | 7/1993 | Nishimura | 408/144 |

FOREIGN PATENT DOCUMENTS

| | | |
|---|---|---|
| 0223585 | 5/1987 | European Pat. Off. . |
| 357379 | 10/1993 | European Pat. Off. . |
| 2270986 | 12/1975 | France . |
| 3620115A1 | 12/1987 | Germany . |
| 5566 | 2/1980 | Japan ........ 408/145 |
| 1078710 | 3/1989 | Japan . |
| 73210 | 3/1991 | Japan ........ 408/144 |
| 170215 | 7/1991 | Japan ........ 408/144 |
| 170216 | 7/1991 | Japan ........ 408/144 |
| 1509076 | 4/1978 | United Kingdom . |

*Primary Examiner*—Daniel W. Howell
*Attorney, Agent, or Firm*—Rohm & Monsanto

[57] ABSTRACT

Wear resistant rotary machining tools including twist drill bits, slot drill bits, thread taps, end mills and reamers are disclosed. The tools comprise a body of cemented tantalum, titanium tungsten carbide (1) having a layer of abrasive polycrystalline diamond or cubic boron nitride compact (2) bonded to a convex curved surface of the tool body. The twist drill bits of the invention comprise a layer of abrasive compact of substantially uniform axial thickness extending over substantially the whole top surface of the tip of the drill bit. Methods of manufacturing the wear resistant tools are also disclosed.

12 Claims, 4 Drawing Sheets

WEAR RESISTANT TOOLS

BACKGROUND OF THE INVENTION

1. Field of the Invention

This invention relates to wear-resistant tools for cutting and drilling and in particular to wear-resistant rotary cutting tools for machining metals and other materials.

2. Description of the Related Art

Almost every product made by the engineering industries requires at some stage in its manufacture the machining of metals or other materials. Typical machining operations include drilling, milling, reaming, thread cutting, slot cutting, and turning. Typically, these operations are carried out by automated machine tools which are fitted replaceably and often interchangeably with tool bits such as drill bits, end mills, thread taps, slot drills and reamers. The preferred shapes of the various cutting tools are well known in the art and will not be described further here.

The material from which the cutting tools are made must combine as far as possible the properties of resistance to deformation (hardness), resistance to fracture (toughness), and resistance to wear (durability). The most widely used materials for this purpose are steel and tungsten carbide. However, both steel and tungsten carbide are prone to wear in the operating environment and as a result cutting tools made of these materials need to be removed for sharpening or replacement quite frequently. The expense of sharpening or replacing the steel or tungsten carbide tool bits, and the machine tool downtime that is needed for their frequent replacement, add considerably to the total cost of the manufacturing process and interfere with the smooth operation of production lines.

Abrasive compacts are also well known in the art and are used extensively in industry for the abrading of various workpieces. They consist essentially of a mass of abrasive particles present in an amount of at least 70 percent, preferably 80 to 90 percent, by volume of the compact bonded into a hard conglomerate. Compacts are polycrystalline masses and can replace single large crystals in many applications. The abrasive particles of compacts are invariably ultra-hard abrasives such as diamond and cubic boron nitride. Compacts containing diamond abrasive particles are known in the art by the initials PCD. Compacts containing cubic boron nitride abrasive particles are known as PCBN.

Abrasive compacts generally contain a second phase or bonding matrix which contains a catalyst (also known as a solvent) useful in synthesising the particles. In the case of cubic boron nitride, examples of suitable catalysts are aluminium or an alloy of aluminium with nickel, cobalt, iron, manganese or chromium. In the case of diamond, examples or suitable catalysts are metals of Groups VIII of the Periodic Table such as cobalt, nickel or iron or an alloy containing such a metal.

As is known in the art, diamond and cubic boron nitride compacts are manufactured under conditions of temperature and pressure at which the abrasive particle is crystallographically stable.

Abrasive compacts may be bonded directly to a tool or shank for use. Alternatively, they may be bonded to a backing such as a cemented carbide backing prior to being mounted on a tool or shank. Such backed compacts are also known in the art as composite abrasive compacts.

The backing will typically be made of cemented carbide such as cemented tungsten carbide, cemented tantalum carbide, cemented titanium carbide or a mixture thereof.

Hitherto, machining tools comprising PCD or PCBN cutting edges have generally been made from flat pieces of PCD or PCBN or their composites. Tools with more complex shapes have generally been made by brazing flat pieces of PCD or PCBN/tungsten carbide composite onto tungsten carbide tool bodies followed by machining the body and composite together to form the desired tool. The limitations that result from using a planar geometry for the PCD layer can readily be appreciated by considering the case of the most widely used machining tool: the twist drill bit.

At present, standard twist drill bits having PCD or PCBN cutting surfaces are mainly of two types, as described in U.S. Pat. Nos. 4,679,971 and 4,527,643. In the first type, a solid disc of PCD or PCBN/tungsten carbide composite is brazed to the tip of a coaxial tungsten carbide shank of similar diameter, resulting in a cylindrical blank tipped at one end with a thin layer of PCD or PCBN. This blank is then machined to the desired drill bit shape. Since the tip of a standard drill bit is preferably pointed with a tip angle of approximately 118°, it follows that drill bits made in the above way are characterised by a PCD or PCBN layer at the cutting edge whose thickness decreases linearly with increasing distance from the rotary axis of the drill bit. Typically, the PCD or PCBN layer near to the distal edge of the tip is extremely thin and therefore relatively weak. Furthermore, resharpening the tool will remove this thin layer entirely.

Drill bits of diameter greater than 5 mm are generally furnished with PCD or PCBN cutting edges by forming a suitable blank of cemented tungsten carbide or similar material, cutting one or more slots into the tip of the blank, and brazing one or more flat pieces of PCD or PCBN/tungsten carbide composite into the slot or slots, followed by machining the blank and inserts jointly to form a drill bit with cutting edges composed of PCD or PCBN. This method of manufacture is expensive. Furthermore, drill bits made in this way are characterised by a non-ideal tip configuration imposed by the flat PCD or PCBN insert. The cutting edges are at the wrong angle and not properly aligned relative to each other, which results in uneven machining and excessive heat generation. The imperfect tip configuration interferes with the removal of swarf.

Drill bits with diameters greater than 5 mm made by the processes described above are currently in use. Their superior wear resistance outweighs their cost and disadvantageous properties. Typically, holes are drilled initially with a PCD or PCBN tipped drill, which drills unevenly for the reasons set out above, and the holes are then given a smooth finish with a conventional steel or tungsten carbide drill.

U.S. Pat. No. 4,713,286 discloses twist drills in the diameter range 0.15–3.2 mm for use in printed circuit board manufacture. These drills are machined from drill blanks, which blanks comprise one or more veins of PCD or PCBN bonded in situ to a cemented tungsten carbide body, the veins of PCD or PCBN positioned to extend longitudinally from the conically shaped point region of the drill blank. Once again the machining required to form the twist drill is complex, and the twist drills provided in this way have non-ideal tip configurations because the cutting edges on opposite sides of the drill tip are not aligned.

The absence of satisfactory PCD or PCBN tipped drills and other rotary cutting tools represents a serious and long-felt deficiency in machine tool technology in view of the outstanding importance of rotary machining operations in most manufacturing processes.

Accordingly, it is an object of the present invention to provide twist drill bits having cutting edges of PCD or PCBN with improved cutting properties, improved toughness and improved durability relative to existing cutting tools of this type.

It is a further object of the present invention to provide slot drills, end mills, thread taps and reamers having the advantageous properties listed above.

It is a further object of the present invention to provide methods of manufacturing the twist drill bits, slot drills, end mills, thread taps and reamers according to the present invention.

SUMMARY OF THE INVENTION

The present invention provides twist drill bits comprising a layer of PCD or PCBN of substantially uniform axial thickness extending over substantially the whole top surface of the tip of the drill. The PCD or PCBN layer is bonded to a drill body comprising cemented tungsten carbide, cemented tantalum carbide, cemented titanium carbide or similar materials. The body may comprise two or more pieces joined together by brazing or other means. The thickness of the PCD or PCBN layer is typically between 0.1 and 2.0 mm and preferably between 0.5 and 1.5 mm.

The present invention further provides a slot drill, end mill, thread tap or reamer comprising a layer of PCD or PCBN bonded to a convex curved surface of a tool body, the layer being shaped to provide a cutting edge composed of PCD or PCBN.

The tool body may comprise cemented tungsten carbide, cemented tantalum carbide, cemented titanium carbide or similar materials. The tool body may comprise two or more pieces joined together by brazing or other means. The thickness of the PCD or PCBN layer normally does not exceed 2.0 mm.

The present invention further provides a method of manufacturing a twist drill bit comprising the following steps: providing a drill blank body having a conical tip; fabricating a drill blank by bonding a layer of PCD or PCBN to substantially the whole surface of the conical tip, said layer having substantially uniform axial thickness; and machining the drill blank to form the twist drill bit. Once again, the drill blank body may comprise steel or tungsten carbide or tantalum carbide or similar materials. The thickness of the PCD or PCBN layer is preferably 0.5 to 1.5 mm.

The present invention further provides a method of manufacturing a slot drill, end mill, thread tap or reamer comprising the following steps: providing a suitably shaped tool blank body; fabricating a tool blank by bonding a layer of PCD or PCBN to a convex curved surface of the body; and machining the tool blank to form the slot drill, end mill, thread tap or reamer.

BRIEF DESCRIPTION OF THE DRAWINGS

Certain embodiments of the invention will now be described further, by way of example, with reference to the accompanying drawings, in which.

DETAILED DESCRIPTION

Figure 1:
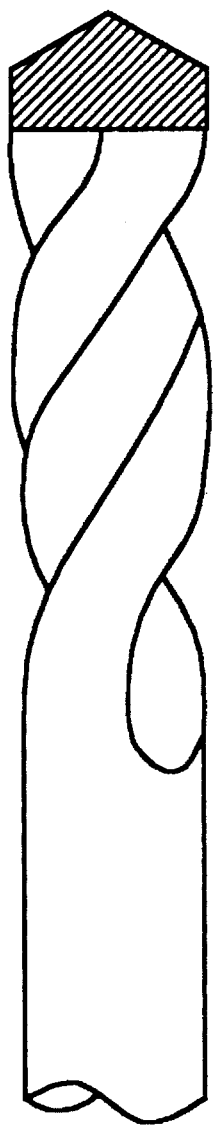
FIG. 1 is a twist drill bit made according to the above-described present method for making twist drill bits of diameter 5 mm or less having a cutting edge of PCD or PCBN. The part of the twist drill bit that is composed of PCD or PCBN is represented by hatching.
Figure 2:
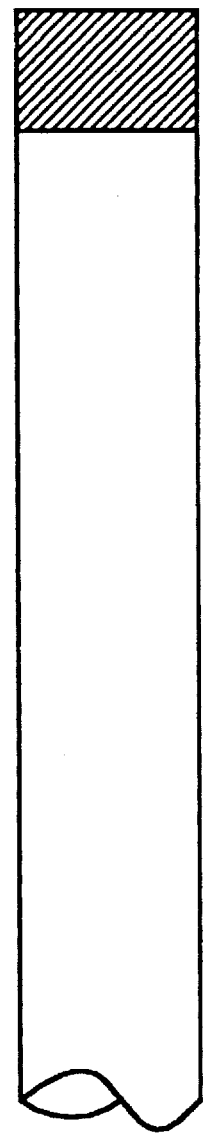
FIG. 2 is a cross-section through one of the drill blanks from which the twist drill bits of FIG. 1 are machined.
Figure 3:
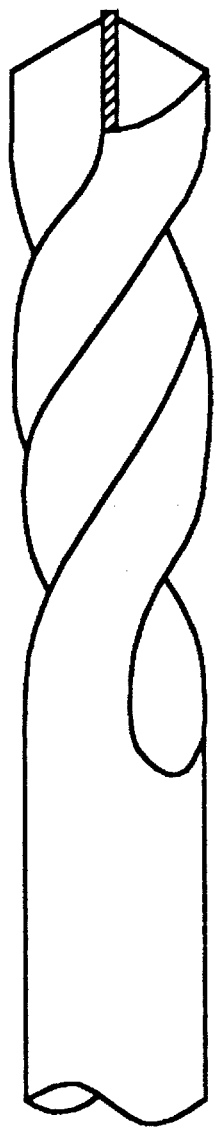
FIG. 3 is a twist drill bit made according to the above-described present method for making twist drill bits of diameter greater than 5 mm having a cutting edge composed of PCD or PCBN.
Figure 4:
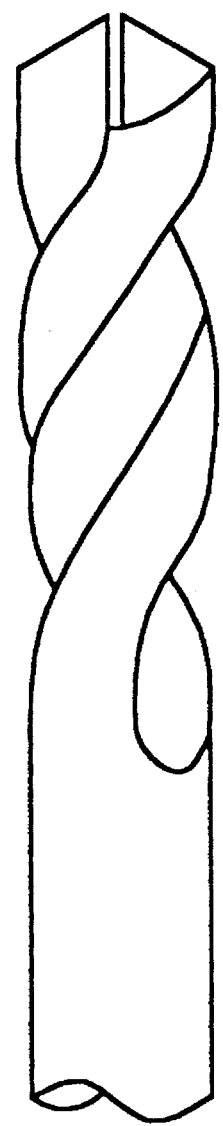
FIG. 4 is the blank into which a PCD or PCBN/tungsten carbide insert is brazed in the method of making the twist drill bits of FIG. 3.

Referring to the drawings, the standard twist drill bits of the invention comprise a body 1 of cemented tungsten carbide or similar material bonded to a layer 2 of PCD or PCBN. An example of a suitable PCD is SYNDITE, a product of the De Beers Industrial Diamond Division (SYNDITE is a Registered Trade Mark of De Beers Industrial Diamond Division). The layer of PCD or PCBN is of substantially uniform axial thickness and extends across the top surface of the tip of the drill bit from the centre of the tip of the drill bit 3 to approximately the distal edge 4 of the tip of the drill bit. This configuration results in a cutting edge at the tip of the drill bit 5 (sometimes referred to in the art as a cutting lip) that is composed of PCD or PCBN, the thickness of the PCD or PCBN underlying the cutting edge being substantially uniform along the cutting edge. The thickness of the PCD or PCBN layer may be chosen so as to optimise the toughness and durability of the drill bit, and is typically 0.1 to 2 mm and preferably 0.5 to 1.5 mm.

It will readily be appreciated that, in the twist drill bit of the invention, the substantially uniform thickness of the PCD or PCBN layer at the cutting edges enables repeated resharpening of the tool. Furthermore, the thickness of the PCD or PCBN layer can be chosen so as to optimise the toughness of the cutting edges. In addition, the limited thickness of PCD or PCBN layers that can be made by existing technology does not impose a limitation on the diameters of the drill bits of the invention. It will also be appreciated that it is straightforward to machine the drill bits of the invention to the optimised configuration for a twist drill bit, or to other desired configurations.

Optionally, the body of the drill bit may be in two or more parts joined together by brazing or other joining means. For example, the tip of the drill bearing the PCD or PCBN layer 6 may be brazed to another piece of the body 7 that forms the shank of the drill bit.

Figure 5:
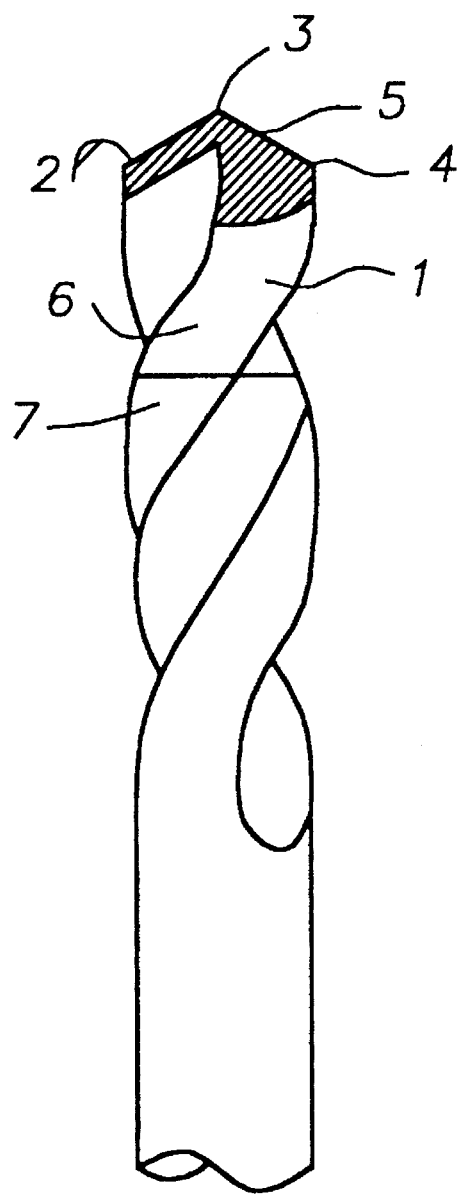
FIG. 5 is a standard twist drill bit according to the present invention.
Figure 6:
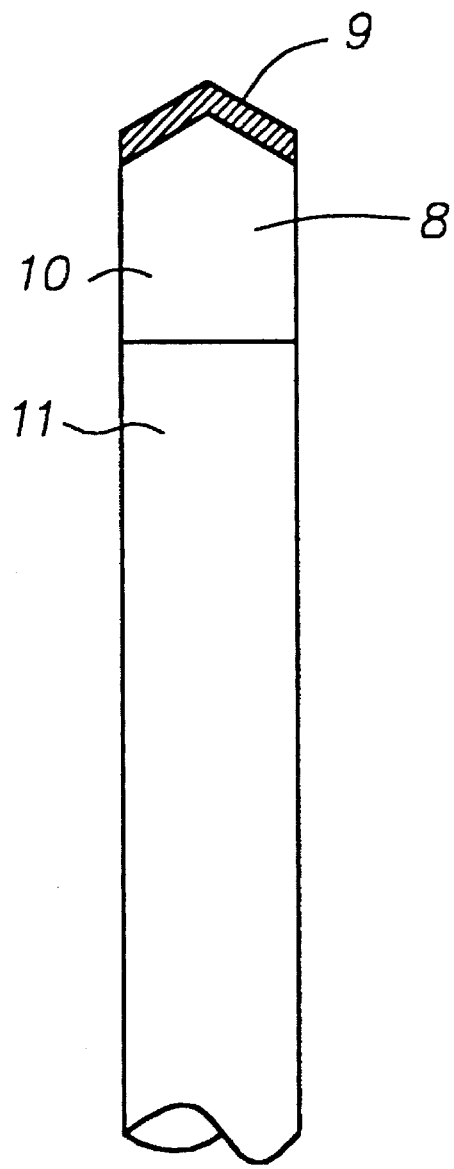
FIG. 6 is a cross-section through a drill blank from which the twist drill bit of FIG. 5 is machined in a manufacturing method according to the present invention.

The twist drill bit of FIG. 5 is machined from the cylindrical blanks having a conical pointed tip of FIG. 6. The cross-sectional angle of the conical pointed tip (the tip angle) may be approximately 118°, the optimum cross-sectional angle for the tip of the finished drill. The cylindrical drill blank comprises a body 8 of cemented tungsten carbide or similar material having a layer of PCD or PCBN 9 in approximately a shape of a hollow cone of substantially uniform thickness extending from the centre of the tip of the drill to approximately the distal edge of the tip of the drill. The thickness of the PCD and PCBN layer is typically 0.1 to 2.0 mm, and preferably 0.5 to 1.5 mm. The twist drill bit of FIG. 5 is made from the drill blank by machining the body and PCD or PCBN layer of the drill blank as a whole into the desired shape for the twist drill bit. This machining may be carried out by grinding with diamond grinding wheels or by electric discharge machining or by other methods known in the art for the machining of very hard and wear-resistant materials.

The blanks for the manufacture of the twist drills of the invention are made by subjecting a layer of diamond powder or cubic boron nitride powder combined with a suitable catalyst-solvent onto the appropriate area of the surface of a tungsten carbide body of the tool blank in a suitably shaped mould to high temperature and pressure.

The PCD or PCBN layer is thus formed in situ, bonded to the appropriate area of the surface of the body of the tool blank. A method of manufacturing PCD layers bonded in situ onto shaped cemented tungsten carbide bodies in disclosed, for example, in European Patent Application No. 89308730.4 (De Beers Industrial Diamond Division (Proprietary) Limited) filed on 30th Aug. 1989.

Typically, the requirements of the high temperature, high pressure apparatus mean that a PCD or PCBN layer is bonded in the bonding step to only a part of the body of the blank 10, corresponding to the tip of the finished drill. The part of the blank with the PCD or PCBN layer bonded to it is then attached to the remainder of the body of the blank 11 by brazing or other appropriate means.

Figure 7:
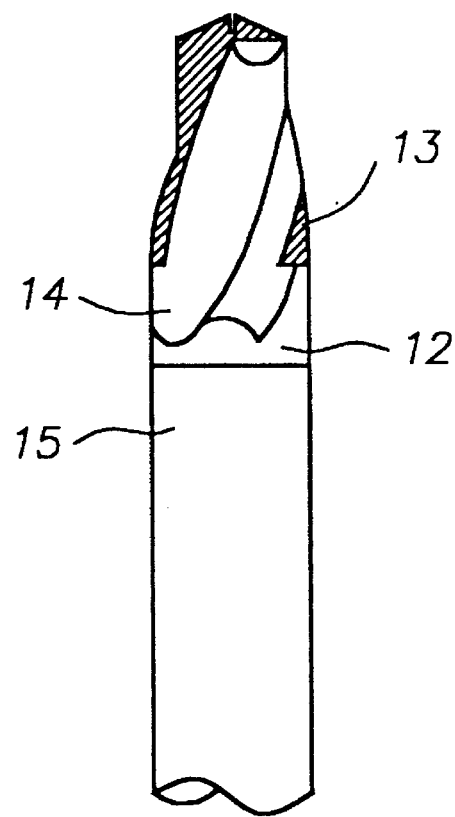
FIG. 7 is a slot drill bit according to the present invention.

The slot drill of FIG. 7 comprises a body 12 of cemented tungsten carbide or similar material bonded to a layer of PCD or PCBN 13. The layer of PCD or PCBN extends across the top surface of the tip of slot drill and some distance down and around the sides of the slot drill below the tip, whereby the cutting edges of the slot drill are substantially composed of PCD or PCBN.

Optionally, the body of the slot drill bit may be in two parts joined together by brazing or other joining means. For example, the tip of the slot drill bit bearing the PCD or PCBN layer (14) may be brazed to another piece of the body (15) that forms the shank of the slot drill bit.

Figure 8:
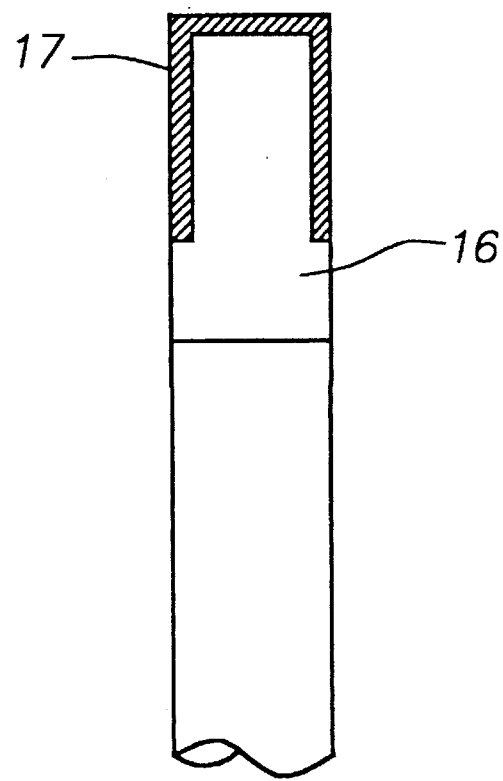
FIG. 8 is a cross-section through a blank from which the slot drill bit of FIG. 7 is machined in a manufacturing method according to the present invention.

The slot drill bit of FIG. 7 is manufactured by machining it from the cylindrical blank of FIG. 8. The blank comprises a body of cemented tungsten carbide or similar material 16 and a layer of PCD or PCBN 17 of substantially uniform thickness and approximately in the form of a cup surrounding and bonded to the top part of the body. The thickness of the PCD or PCBN layer is typically between 0.1 and 2.0 mm, and preferably between 0.5 and 1.5 mm. The slot drill bits of the invention are made from the blanks by machining the body and the PCD or PCBN layer of the drill blank as a whole into the desired shape for the slot drill bit. This machining is carried out as described above.

The blanks for the manufacture of the slot drill bits of the invention according to the process of the invention are made as described above by use of a suitably shaped tungsten carbide body and mould in a high temperature, high pressure synthesis step. The blanks may comprise two or more pieces brazed together as described above.

It will be readily apparent to persons skilled in the art that the other tool bits of the invention can be made by variations of the methods of manufacture described above.

I claim:

1. A machining tool comprising an elongated tool body having a top machining surface, side machining surfaces, and a bottom surface, said top machining surface and a portion of said side machining surfaces depending downwardly therefrom formed with machining faces and wherein at least said top machining surface and a portion of said downwardly depending surfaces adjacent thereto are coated with a layer of PCD or PCBN of substantially uniform axial thickness prior to said machining faces being formed therein.

2. A machining tool according to claim 1 wherein said PCD or PCBN layer is bonded to a body formed of cemented tungsten carbide, cemented tantalum carbide, or cemented titanium carbide.

3. A machining tool according to claim 1 wherein the machining tool is a twist drill bit.

4. A machining tool according to claim 3 wherein the layer of PCD or PCBN is applied to the tool when same is in a blank form to extend over said top machining surface and said downwardly depending side machining surfaces therefrom to form a conically shaped coating.

5. A machining tool according to claim 3 wherein the drill bit comprises two or more pieces joined together by brazing.

6. A machining tool according to claim 3 wherein the axial thickness of said PCD or PCBN layer is between 0.1 and 2.0 mm.

7. A machining tool according to claim 3 wherein the axial thickness of said PCD or PCBN layer is between 0.5 and 1.5 mm.

8. A machining tool according to claim 3 wherein said top machining surface has a tip forming a tip angle with said side machining surfaces which is approximately 118°.

9. A machining tool according to claim 1 wherein the machining tool is any of a slot drill, end mill, thread tap, or reamer.

10. A machining tool according to claim 8 wherein the axial thickness of said layer of PCD or PCBN is between 0.1 mm and 2.0 mm.

11. A machining tool according to claim 8 wherein the tool body comprises at least two parts joined together by brazing.

12. A machining tool according to claim 9, wherein the machining tool is a slot drill, end mill, thread tap, or reamer comprising two or more parts joined together by brazing.

* * * * *